United States Patent Office 3,689,457
Patented Sept. 5, 1972

3,689,457
NOVEL POLYAMIDES HAVING AN AMINE FUNCTION
Andre Rio, Lyon, France, assignor to Rhone-Poulenc S.A., Paris, France
No Drawing. Continuation of abandoned application Ser. No. 762,349, Sept. 16, 1968. This application Jan. 20, 1971, Ser. No. 108,196
Claims priority, application France, Sept. 21, 1967, 121,812
Int. Cl. C08g 20/08
U.S. Cl. 260—47 CP       5 Claims

ABSTRACT OF THE DISCLOSURE

The invention provides novel polyamides containing a 5-amino-isophthaloyl residue, optionally with other acid residues, linked via polyamine residues. These polyamides are useful, inter alia, in purifying aldehydes.

---

This application is a continuation of application Ser. No. 762,349, filed Sept. 16, 1968 and now abandoned.

This invention relates to polyamides containing an amine function, their preparation and their use.

Polymers containing free reactive groupings in the chain, and notably those containing amine groupings, are in great demand, because the presence of these reactive centres permits multiple conversions by which various properties such as for example, adherence to a substrate or dyeing affinity, can be imparted to the polymers.

Such polymers may also be employed in the purification of complex chemical mixtures, because, owing to their reactive groupings, they can combine with various substances to form readily isolatable reaction products, from which the starting components can subsequently be extracted by an appropriate treatment.

The present invention provides new polyamides containing free aromatic primary amino groups consisting of units of the formula:

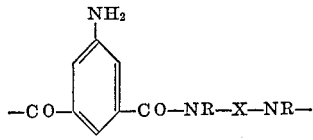

alone or with units of the formula:

—CO—Y—CO—NR—X—NR— in which X and Y represent the same or different divalent organic radicals, and R represents hydrogen, lower alkyl, cycloalkyl of 5 or 6 ring carbon atoms, phenyl, lower alkyl-substituted phenyl or aralkyl, the two R's in the group —NR—X—NR— being optionally joined to form a heterocyclic ring containing two nitrogen atoms. At least part of the groups: —NR—X—NR— and

—CO—Y—CO— may be replaced by groups of the formula

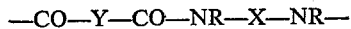

respectively, in which Z and T are the same or different organic radicals of valency $n$, $n$ being an integer greater than 2, preferably 3 or 4. Depending on whether or not such groups are present, the polymers of the invention may be linear or three-dimensional. By "lower alkyl" is meant an alkyl radical having from 1 to 4 carbon atoms.

In the new polymers, a number of radicals X of different nature may co-exist, and the same is true with Y, Z or T.

In accordance with the invention, the new polyamides are made by reacting 5-amino-isophthaloyl chloride in which the amino group is blocked, alone or in association with an acid chloride of formula $Y(COCl)_2$ and/or $T(COCl)_n$, with a polyamine of formula: $X(NHR)_2$ and/or $Z(NHR)_n$, where X and Y represent the same or different divalent organic radicals, R represents hydrogen, lower alkyl, cycloalkyl of 5 or 6 ring carbon atoms, phenyl, lower alkyl-substituted phenyl, or aralkyl, the two R's in the polyamine $X(NHR)_2$ being optionally joined to form a heterocyclic ring containing two nitrogen atoms, and Z and T are the same or different organic radicals of valency $n$, $n$ being an integer greater than 2, and removing the groups blocking the amino radicals from the polyamide obtained. Reagents are preferably used in such ratios as they provide with the same number of antagonistic groups i.e. —COCl groups and free amino groups.

The blocking of the amino function may be carried out directly on 5-aminoisophthalic acid, by any known method, such as, for example, one of those described in the work "Advances in Organic Chemistry" 3, pages 160–184 (1963). Of these various processes, experience has shown that blocking with o-phthalic anhydride, indicated on page 179 of the aforesaid work, gives the best results in the polycondensation. This type of blocking can be effected in excellent yield. Thus, by reaction between 5-aminoisophthalic acid and o-phthalic anhydride in acetic acid medium, 5-(2'-carboxybenazmido)isophthalic acid is obtained which, when treated with phosphorus pentachloride or thionyl chloride, leads to 5-phthalimidoisophthaloyl dichloride in substantially quantitative yield.

The 5-aminoisophthaloyl dichloride having a blocked amine grouping is subjected to polycondensation, optionally in association with one or more other acid polychlorides. Of these polychlorides, there may be mentioned more particularly the polychlorides of oxalic, maleic, succinic, glutaric, adipic, azelaic, 1,4-cyclohexanedicarboxylic, 1,3- and 1,4-benzenedicarboxylic, 1,8-naphthalenedicarboxylic and 1,3,5-benzenetricarboxylic acid. Thus, in the polymers of the invention and Y radical present is preferably alkylene of 1 to 10 carbon atoms, alkenylene of 2 to 10 carbon atoms, 1,3- or 1,4-cyclohexylene, m or p-phenylene, or 1,8-naphthylene, and any T radical is preferably

($n$ being 3).

The amines employed in the polycondensation may be aliphatic, cycloaliphatic, heterocyclic or aromatic polyamines. Suitable such amines are 1,2-diaminoethane, 1,2- and 1,3-diaminopropane, 1,6-diaminohexane, 1-amino-2-aminomethylcyclopentane, 1,3-diaminocyclohexane, 1,3-diaminomethylcyclohexane, piperazine, m and p-phenylene diamine, 4,4'-diaminodiphenyl, 4,4'-diaminodiphenylether, 4,4'-diaminodiphenylmethane and 1,3,5-triaminobenzene. More generally, it may be said that X is preferably alkylene of 2 to 10 carbon atoms, m or p-phenylene, a radical of formula:

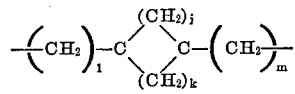

where $j$ is 1 or 2, $k$ is 2 or 3, the sum of $j$ and $k$ being 3 or 4, and 1 and $m$ are each 0 or 1,

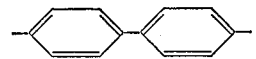

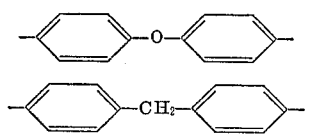

or

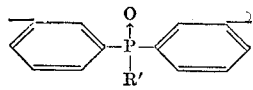

(where R' is lower alkyl) or $$-NR-X-NR-$$

is

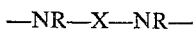

Z is preferably

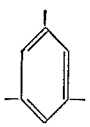

($n$ being 3).

The polycondensation may be carried out in solution. In this case, it is preferable to operate in the presence of solvents of high polarity, such as dimethylformamide, dimethylacetamide, N-methylpyrrolidone, dimethylsulphoxide or tris-(dimethylamino)-phosphine oxide, in order to maintain the polymer in solution. The reaction is preferably carried out by introducing the polyamide or polyamines into the chosen solvent and adding with stirring the 5-aminoisophthaloyl dichloride having a blocked amine function, optionally in association with other acid polychlorides. The reaction temperature is kept at a fairly low level, preferably between −20° C. and +20° C.

The polymer thus formed may be isolated from its solution by any known means such as evaporation of the solvents or addition of a precipitating agent such as, for example, water.

It is also possible to carry out the polycondensation in a heterogeneous medium by the process commonly known as interfacial polycondensation. In this type of reaction, the polyamine or polyamines are brought into aqueous solution as water-soluble salts, such as hydrohalides, for example, and this solution is added to a solution of the acid polychloride or polychlorides in a solvent immiscible with water, preferably an aromatic hydrocarbon such as benzene, toluene, or xylene or a halogenated aliphatic hydrocarbon such as chloroform or 1,2-dichloroethane. The reaction medium having two liquid phases which is thus obtained is vigorously stirred at ambient temperature, while an aqueous sodium or potassium hydroxide solution is added until a persistent alkaline pH is obtained in the aqueous phase. The polymer formed precipitates and is recovered by filtration and washing.

The polyamides obtained by interfacial polycondensation or by polycondensation in solution are subjected to a treatment for deblocking the amine function. To this end, any known method may be adopted, but when the protective grouping is a phthalimide grouping, it is advantageous to effect the regeneration of the amine function by the action of hydrazine hydrate, in accordance with the method advocated by Sheehan et al., J. Amer. Chem. Soc. 1856 (1949) for preparing the anilide of glycine. This method consists in treating the polyamide having phthalimide groupings with an aqueous hydrazine hydrate solution at a temperature of about 60° C., in the presence of an acid or a base. In the present case, it is generally more advantageous to operate in an alkaline medium because the phthalic hydrazide formed is soluble in this medium, which renders possible a ready recovery of the polymer by simple filtration.

The polyamides having free aromatic primary amine groupings which are thus obtained are industrial products which may be employed notably for the extraction of compounds having an aldehyde function from complex chemical mixtures which comprise no other substances which are reactive with $NH_2$ groups. The —CHO groups become attached to the —$NH_2$ groups by the formation of imine bonds, which greatly facilitates the aforesaid separation. This method is advantageous since a simple treatment with a mineral acid such as sulphuric or phosphoric acid is sufficient to liberate the aldehyde, and thereafter the polymer may be regenerated by a simple alkaline washing. The aldehyde may also be liberated by displacement with another compound having a —CHO group. This reaction for the fixation of the aldehyde is generally carried out in a diluent chosen from water, the aromatic hydrocarbons, the halogenated aliphatic and aromatic hydrocarbons, the alcohols, the ethers and the lower aliphatic acids.

The following examples illustrate the invention.

EXAMPLE 1

Into a 200 cc. round-bottomed flask are introduced 4.32 g. of 1,3-diaminobenzene and 100 cc. of dimethylacetamide. After cooling to about −10° C., 14 g. of 5-phthalimidoisophthaloyl dichloride (prepared as hereinafter indicated) are added in one hour, with stirring and in small portions. The stirring is continued for a further hour at −10° C., and the product is then allowed to return to ambient temperature. The reaction mixture is poured into 1 litre of water, and the precipitate is then ground, washed abundantly with water and dried at 100° C. under a pressure of 50 mm. Hg.

15.3 g. of polymer are thus obtained, which are heated under a nitrogen atmosphere at 60° C. for 4 hours in the presence of 40 cc. of an aqueous solution containing 10% of hydrazine hydrate and 10% of sodium carbonate. The product is filtered off, washed with water and dried at 100° C. under a pressure of 50 mm. Hg. 10.2 g. of a polymer containing 3.4 milliequivalents of $NH_2$ per gram are thus obtained.

5-phthalimidoisophthaloyl dichloride is prepared as follows. Into a 2-litre round-bottomed flask 181 g. of 5-aminoisophthalic acid, 148 g. of orthophthalic anhydride and 1 litre of acetic acid are introduced, and the mixture is then stirred and refluxed for 1 hour. After cooling to ambient temperature, the product is filtered off, washed with 1 litre of acetic acid and dried at 100° C. under a pressure of 50 mm. Hg. 304 g. of 5-(2′-carboxybenzamido)isophthalic acid are thus obtained.

300 g. of 5-(2′-carboxybenzamido)isophthalic acid are introduced into a 3-litre round-bottomed flask with 1.5 litre of thionyl chloride. The mixture is refluxed and 1 cc. of pyridine is added when the evolution of hydrogen chloride starts to slow down. Heating under reflux is continued until the evolution of gas ceases, and, after cooling, the excess of thionyl chloride is eliminated by gradually heating to 60° C. under a reduced pressure of 50 mm. Hg. The residue consists of 320 g. of crude product, which is purified as follows. 290 g. of the crystals are dissolved in 500 cc. of chlorobenzene at elevated temperature. The insoluble fraction is eliminated by hot filtration, and the product is crystallised by cooling. After filtration, the crystals are washed with 100 cc. of chlorobenzene and dried at 100° C. under a pressure of 50 mm. Hg. 203 g. of 5-phthalimidoisophthaloyl dichloride are thus obtained.

EXAMPLE 2

Into a 1-litre round-bottomed flask provided with a turbine stirrer, 7 g. of 5-phthalimidoisophthaloyl dichloride in solution in 200 cc. of benzene, and a solution comprising 100 cc. of water, 2.16 g. of m-phenylene diamine and 8 cc. of 10 N hydrochloric acid are introduced. The mixture is vigorously stirred and a 5% aqueous sodium hydroxide solution is added until a persistent alkaline pH is obtained. This addition lasts about 1 hour. The precipitate formed is filtered off, abundantly washed with water and dried. 6.6 g. of polymer having blocked amine groupings are obtained, which is heated at 60° C. for 4 hours, under a nitrogen atmosphere and with stirring, with 20 cc. of an aqueous solution containing 10% of hydrazine hydrate and 10% of sodium carbonate. After filtration, washing with water and drying, 3.83 g. of a polyamide containing 3.6 milliequivalents of $NH_2$ per gram are obtained.

EXAMPLE 3

The procedure of Example 2 is followed, with 14 g. of 5-phthalimidoisophthaloyl dichloride in solution in 150 cc. of chlorobenzene and a solution containing 100 cc. of water, 4.64 g. of 1,6-diaminohexane and 16 cc. of 10 N hydrochloric acid. The deblocking of the amine function is effected with 40 cc. of an aqueous solution containing 10% of hydrazine hydrate and 10% of sodium carbonate as described in Example 1. 8.2 g. of a polyamide containing 4.5 milliequivalents of $NH_2$ per gram are obtained.

EXAMPLE 4

The procedure of Example 2 is followed, but with the following reactants:

Organic phase:
| | |
|---|---|
| Chlorobenzene _____cc__ | 70 |
| 5-phthalimidoisophthaloyl dichloride _____g__ | 5.2 |
| Trichloride of 1,3,5-benzenetricarboxylic acid g__ | 0.9 |

Aqqueous phase:
| | |
|---|---|
| Water _____cc__ | 50 |
| m-Phenylene diamine _____g__ | 2.16 |
| 10 N hydrochloric acid _____cc__ | 8 |

5.51 g. of a crosslinked polyamide containing 3 milliequivalents of $NH_2$ per gram are thus obtained.

EXAMPLE 5

This test is identical to that described in Example 4, the m-phenylene diamine being replaced by 2.32 g. of 1,6-diaminohexane. 3.6 g. of crosslinked polyamide which contains 3 milliequivalents of $NH_2$ per gram are obtained.

EXAMPLE 6

In a 500 cc. round-bottomed flask, 8.64 g. of m-phenylene diamine are dissolved in 200 cc. of dimethylacetamide. The solution is cooled to about −10° C. and a mixture of 20.8 g. of 5-phthalimidoisophthaloyl dichloride and 3.6 g. of the trichloride of 1,3,5-benzenetricarboxylic acid is added in one hour at this temperature. Stirring is continued for 1 hour at −10° C. and the mixture is allowed to return to ambient temperature. The mixture is then poured into 2 litres of water and the polymer is filtered off, ground, washed and dried, its amine groupings being deblocked by the procedure of Example 1 with 80 cc. of aqueous hydrazine solution. 27.2 g. of a crosslinked polyamide comprising 2.7 milliequivalents of $NH_2$ per gram are obtained.

The following mixture is heated under reflux for 1 hour:

Polyamide having amine groupings prepared as just
| | |
|---|---|
| described _____g__ | 2 |
| Benzaldehyde _____cc__ | 2 |
| Acetic acid _____cc__ | 20 |

The polymer is filtered off, washed with 50 cc. of ethanol and dried. It is then divided into two equal fractions and subjected to the following 2 modes of regeneration:

(a) Acid treatment 10 cc. of water and 0.5 cc. of phosphoric acid are added to the first fraction, and the mixture is steam distilled. By extraction of the distillate with diethyl ether, 0.24 g. of benzaldehyde is recovered (theoretical maximum 0.28 g.). The polymer is regenerated by washing with a 5% aqueous sodium hydroxide solution.

(b) Displacement of the benzaldehyde by salicylic aldehyde

The second fraction is introduced into a mixture containing 10 cc. of acetic acid and 3 cc. of salicylic aldehyde, and the whole is then brought to 120° C. for 1 hour. By chromatography in the vapour phase, 0.24 g. of benzaldehyde is detected in the solution, i.e. the quantity fixed at the outset, according to the preceding test (a).

EXAMPLE 7

In a 500 cc. round-bottomed flask provided with a stirrer, 19.8 g. of bis-(4-aminophenyl)methane are dissolved in 200 cc. of dimethylacetamide. The solution is cooled to −15° C., and 34.8 g. of 5-phthalimidoisophthaloyl dichloride are added in one lot. The mixture is kept at −10° C. with stirring for 2 hours 30 minutes, and then at 20° C. for 1 hour. The mixture is passed into 2 litres of water, and the polymer obtained is filtered, ground, washed and dried, its specific viscosity being 1.1 (measured at 25° C. as a 1% solution in dimethyl acetamide).

The amine functions of this polymer are deblocked with 200 cc. of an aqueous hydrazine solution as described in Example 1.

EXAMPLE 8

The procedure of Example 7 is followed, the bis-(4-aminophenyl)methane being replaced by 21.8 g. of methyl-bis-(3-aminophenyl)phosphine oxide. The polymer comprising blocked amine groupings has a viscosity of 0.35.

What is claimed is:

1. A polyamide consisting of recurring units of the formula in which R is selected from the group consisting of

—NH—X—NH— and wherein X is selected from the group consisting of alkylene of 2 to 10 carbon atoms, m-phenylene, p-phenylene, and wherein $i$ is 0 or 1, $j$ is 1 or 2, $k$ is 2 or 3 with the sum of $j$ and $k$ being 3 or 4, $m$ is 0 or 1 and R″ is lower alkyl.

2. A polyamide according to claim 1 in which X is

—$(CH_2)_6$— or m-phenylene.

3. A polyamide consisting of recurring units of the formula

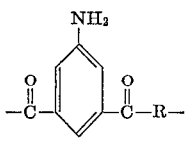

in which R is selected from the group consisting of

—NH—X—NH— and

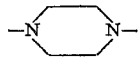

wherein X is selected from the group consisting of alkylene of 2 to 10 carbon atoms, m-phenylene, p-phenylene,

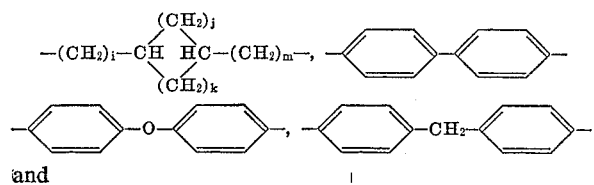

and

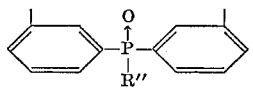

wherein $i$ is 0 or 1, $j$ is 1 or 2, $k$ is 2 or 3 with the sum of $j$ and $k$ being 3 or 4, $m$ is 0 or 1 and R″ is lower alkyl where the groups —NH—X—NH— or

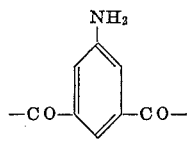

are replaced in an amount up to a mole ratio of about 1:0.22 by groups of the formula

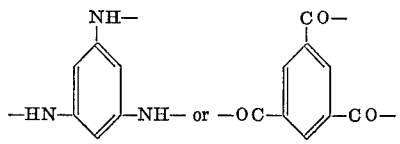

respectively.

4. A polyamide according to claim 3 in which the groups:

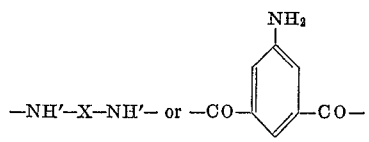

are replaced in a molar amount of about 1:0.22 by groups of the formula:

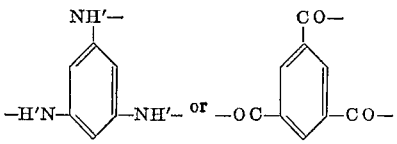

respectively.

5. A polyamide according to claim 4 in which the groups:

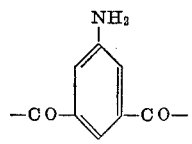

are replaced in a molar amount of about 1:0.22 by groups of the formula:

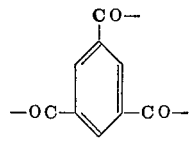

References Cited

UNITED STATES PATENTS

| | | | |
|---|---|---|---|
| 3,052,655 | 9/1962 | Fox et al. | 260—78 |
| 3,450,678 | 6/1969 | Rogers | 260—78 |
| 3,472,819 | 10/1969 | Stephens | 260—78 |

WILLIAM H. SHORT, Primary Examiner

L. L. LEE, Assistant Examiner

U.S. Cl. X.R.

260—30.2, 30.6 R, 30.8 DS, 32.6 N, 78 A, 78 TF, 78 SC